United States Patent
Moriya et al.

(10) Patent No.: US 7,289,726 B2
(45) Date of Patent: Oct. 30, 2007

(54) DEVICE FOR PHOTOGRAPHING PROVIDED WITH FLASH UNIT

(75) Inventors: Mitsuhiro Moriya, Minami-Ashigara (JP); Kazuto Ando, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 233 days.

(21) Appl. No.: 11/091,763

(22) Filed: Mar. 29, 2005

(65) Prior Publication Data

US 2005/0213956 A1    Sep. 29, 2005

(30) Foreign Application Priority Data

Mar. 29, 2004   (JP)   .............................. 2004-097094

(51) Int. Cl.
*G03B 17/18* (2006.01)
*G03B 11/00* (2006.01)

(52) U.S. Cl. ........................ 396/202; 396/287; 396/544
(58) Field of Classification Search ................ 396/6, 396/544, 201–202, 287, 281
See application file for complete search history.

(56) References Cited

U.S. PATENT DOCUMENTS

| | | | | |
|---|---|---|---|---|
| 2,921,509 A | * | 1/1960 | Freund | .................... 396/334 |
| 4,072,973 A | | 2/1978 | Mayo | ........................ 396/544 |
| 4,736,220 A | * | 4/1988 | Heinzelmann | .............. 396/544 |
| 5,552,850 A | * | 9/1996 | Matsumoto | ................ 396/544 |
| 6,264,379 B1 | * | 7/2001 | Rydelek et al. | ............ 396/423 |

FOREIGN PATENT DOCUMENTS

JP    2003-078792    3/2003

* cited by examiner

*Primary Examiner*—Christopher Mahoney
(74) *Attorney, Agent, or Firm*—Young & Thompson

(57) ABSTRACT

A lens-fitted photo film unit includes an electronic flash unit. A flash readiness indicator is secured to a housing, for illuminating to signal readiness of the flash unit upon charging. An attention information indicator having optical transmittance is secured to an end portion of the flash readiness indicator removably to protrude from the housing, for illuminating in response to illumination of the flash readiness indicator visibly from an object side. Also, the flash unit includes a flash light source for applying flash light to a photographic field. A flash circuit controls the flash light source. A signaling light-emitting element emits light in response to completion of charging of the flash circuit. The flash readiness indicator comprises a light conducting optical element for conducting the light from the signaling light-emitting element to an outside of the housing.

18 Claims, 8 Drawing Sheets

DEVICE FOR PHOTOGRAPHING PROVIDED WITH FLASH UNIT

BACKGROUND OF THE INVENTION

1. Field of the Invention

The present invention relates to a device for photographing provided with a flash unit. More particularly, the present invention relates to a device for photographing an image and with which attention of a person to be photographed can be drawn to the device body while flash light is applied to the person.

2. Description Related to the Prior Art

Various types of cameras as optical instruments are known as devices for photographing an image of a landscape, person, animal and the like, for example a lens-fitted photo film unit, photographic camera, digital still camera and the like. A photographing lens in the camera is directed to a person as an object for framing. A shutter release button is depressed to photograph an image. In general, a user handling the camera makes the person draw attention to the camera by calling with voices or sounds for the purpose of pointing of a line of sight of the object. Also, a doll or other conspicuous articles may be moved or shaken in the vicinity of the camera to have the object look at the camera.

If a user wishes to photograph a baby, pet or other animals as the object, it is likely that the object does not watch the camera because of lack of understanding the intention of aiming at the object with the camera. It is very difficult to encourage him or her to draw attention to the camera.

JP-A 2003-078792 and U.S. Pat. No. 4,072,973 disclose a type of the camera having a sound source and light source, for encouraging a person to draw attention to the camera.

However, the use of the doll or other conspicuous articles for encouraging attention to the camera requires a large additional preparation. Also, an assistant to the user must cooperate for the purpose of shaking the doll or other conspicuous articles because the user cannot easily photograph an image in shaking the doll or other conspicuous articles. In relation to the known structure of the camera according to the above document, a controller and electric power are required in addition to the sound source and light source. This will raise the cost and enlarge the size of the camera.

SUMMARY OF THE INVENTION

In view of the foregoing problems, an object of the present invention is to provide a device for photographing an image and with which attention of a person to be photographed can be drawn to the device body while flash light is applied to the person.

In order to achieve the above and other objects and advantages of this invention, a device for photographing includes a housing provided with an electronic flash unit. A flash readiness indicator is secured to the housing, for illuminating to signal readiness of the flash unit upon charging. An attention information indicator has optical transmittance, is secured to the flash readiness indicator removably to protrude from the housing, for externally emitting light emitted by the flash readiness indicator visibly from an object side.

The device for photographing is a camera or a lens-fitted photo film unit pre-loaded with photo film.

The one portion of the flash readiness indicator is one end portion. Furthermore, a recess is formed in the attention information indicator, for retention on the end portion.

The flash unit includes a flash light source for applying flash light to a photographic field. A flash circuit controls the flash light source. A signaling light-emitting element emits light in response to completion of charging of the flash circuit. The flash readiness indicator comprises a light conducting element or light guide for conducting the light from the signaling light-emitting element to an outside of the housing.

The attention information indicator is secured by use of an adapter to the one portion of the flash readiness indicator.

The adapter has two portions so disposed that the housing is disposed between these two portions and in a clipped manner.

The adapter extends from an upper face of the housing toward a lower face thereof.

In a preferred embodiment, furthermore, a recess is formed in a surface of the housing. The adapter includes a retaining projection for engagement with the recess to retain the adapter on the housing.

The adapter extends from an upper face of the housing downwards, and the retaining projection is formed with one lower end of the adapter.

In another preferred embodiment, furthermore, an outer case contains the housing internally. The attention information indicator is secured by use of the outer case to the one portion of the flash readiness indicator.

In a preferred embodiment, furthermore, a strap portion is secured to the housing, and adapted to handling of the housing with portability. The attention information indicator is connected with the strap portion in an accessory manner, and secured for use to the one portion of the flash readiness indicator removably.

The strap portion has one strap end. Furthermore, an accessory retaining portion is formed on the housing, for retention of the strap end. An extension strip or chain-shaped strip has first and second portions, the first portion being secured to the strap end, and the second portion being provided with the attention information indicator.

The extension strip is in a chain form.

Furthermore, an auxiliary strip secures the first portion of the extension strip to the accessory retaining portion.

The flash unit is incorporated therein.

According to one aspect of the invention, a device for photographing provided with an electronic flash unit includes a housing. A flash readiness indicator is secured to the housing, for illuminating to signal information of readiness of the flash unit upon charging. There is an attention information indicator, having optical transmittance, secured to the housing removably by use of an adapter, for illuminating in response to illumination of the flash readiness indicator visibly from an object side.

In a preferred embodiment, the adapter is constituted by an outer case for containing the housing.

According to another aspect of the invention, a device for photographing provided with an electronic flash unit includes a housing. A flash readiness indicator has optical transmittance, is secured to the housing, for illuminating to signal information of readiness of the flash unit upon charging. A strap portion is secured to the housing, and adapted to handling of the housing with portability. An attention information indicator is connected with the strap portion in an accessory manner, secured for use to the one portion of the flash readiness indicator removably to protrude from the housing, for illuminating in response to illumination of the flash readiness indicator visibly from an object side.

Consequently, attention of a person to be photographed can be drawn to the device body while flash light is applied to the person, owing to the use of the attention information indicator with signaling light.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
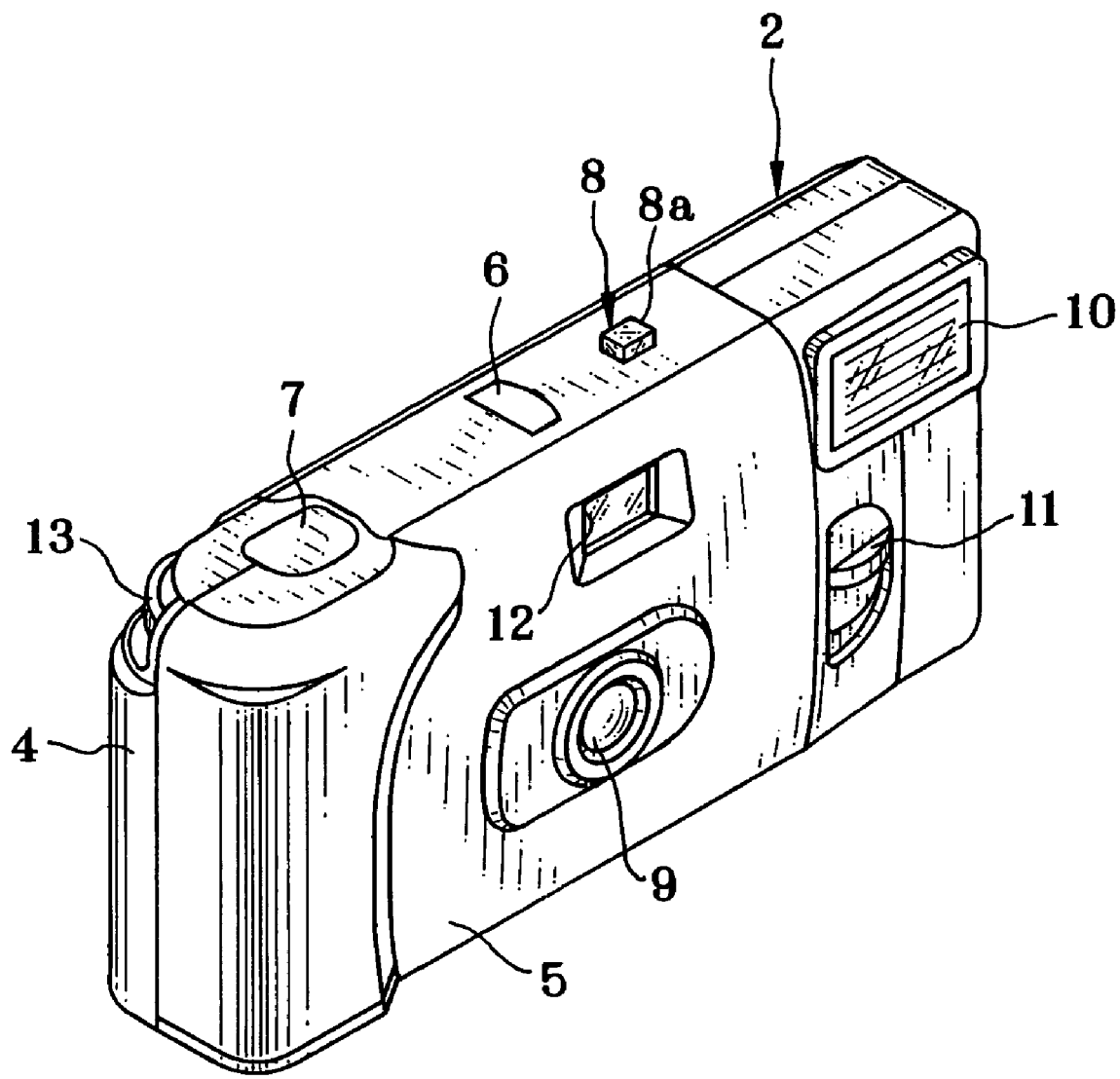
FIG. 1 is a perspective view illustrating a lens-fitted photo film unit.
Figure 2:
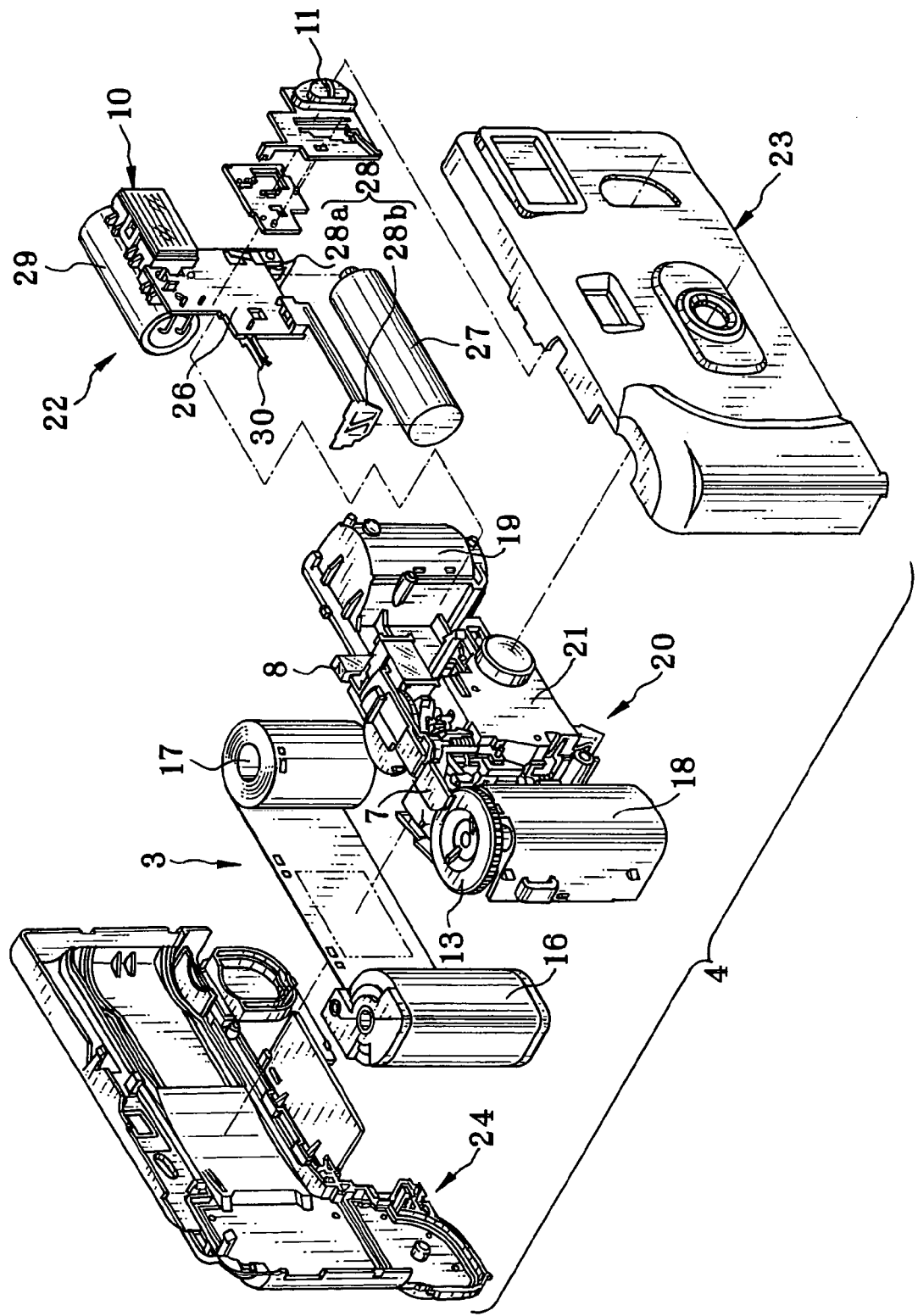
FIG. 2 is an exploded perspective view illustrating the lens-fitted photo film unit.

In FIG. 1, a lens-fitted photo film unit 2 is illustrated, and has a photo film housing 4. A photo film cartridge 3 illustrated in FIG. 2 is pre-loaded in the photo film housing 4. Mechanisms for the purpose of taking exposures on to photo film are incorporated in the photo film housing 4. An outer sticker 5 is firmly attached to a middle portion of the photo film housing 4.

An upper face of the photo film housing 4 has a frame counter window 6, a shutter release button 7, and a flash readiness indicator 8 or a light conducting optical element or light guide. A front face of the photo film housing 4 is provided with a taking lens 9, a flash light source 10, a flash charger switch 11 with a slidable button, and a front window of a viewfinder 12. A rear race of the photo film housing 4 has a winder wheel 13.

The outer sticker 5 is a belt of paper or cardboard, has a back surface coated with adhesive agent, and is attached to the middle of the photo film housing 4 in a belt shape. There are openings in the outer sticker 5 for uncovering a front of the taking lens 9, the viewfinder 12 and the frame counter window 6. Also, information is printed on the outer sticker 5, such as method of using, notice and the like relevant to the use of the lens-fitted photo film unit 2.

An upper end 8a of the flash readiness indicator 8 protrudes upwards from an upper surface of the photo film housing 4. When the button of the flash charger switch 11 is slid up, a flash unit is charged. A flash circuit board 26 of a printed board includes a signaling light-emitting diode (LED). Upon completion of the charging, the signaling LED is driven to emit light for signaling. The flash readiness indicator 8 is a light guide or optical member for internally guiding light, and is a part formed from resin having high optical transmittance. The flash readiness indicator 8 causes light from the signaling LED to advance so the upper end 8a emits light externally out of the photo film housing 4. A user of the lens-fitted photo film unit 2 can be informed by the flash readiness indicator 8 of a state of the flash light source 10 ready for emitting flash light.

In FIG. 2, various elements of the photo film housing 4 are illustrated in a disassembled state. The photo film housing 4 includes a main body 20, an exposure unit 21, an electronic flash unit 22, a front cover 23 and a rear cover 24. The main body 20 is formed from plastic material. A cartridge holder chamber 18 and a roll holder chamber 19 are formed in the main body 20. A cartridge shell 16 is loaded in the cartridge holder chamber 18. A roll of photo film 17 is loaded in the roll holder chamber 19. The exposure unit 21 and the flash unit 22 are fitted on the front of the main body 20. The front cover 23 and the rear cover 24 are formed respectively from plastic material, and fitted on the front and rear of the main body 20.

There is an exposure aperture formed between the cartridge holder chamber 18 and the roll holder chamber 19, and defines an exposure region of one frame by limiting object light passed through the taking lens 9. The exposure unit 21 is a unit having a combination of shutter mechanism, frame counter, one-frame advancing mechanism and other mechanisms required for taking photographs. The exposure unit 21 is secured to the main body 20 removably by coupling of hooks and receiving portions.

The winder wheel 13 is set on an upper face of the cartridge holder chamber 18, and when rotated, causes the photo film to move for one-frame advance. The frame counter wheel is rotated by one rotational step under the frame counter window 6 by the advance. Upon completion of the one-frame advance, the winder wheel 13 becomes locked by actuation of the one-frame advancing mechanism.

While the winder wheel 13 is rotated to advance the photo film, the shutter mechanism is charged. Then the shutter release button 7 is depressed to take one exposure by opening and closing a shutter blade of the shutter mechanism. The winder wheel 13 is released from being locked. The one-frame advance and the depression of the shutter release button 7 are repeated, to advance an exposed position of the photo film 17 into the cartridge shell 16.

The flash unit 22 includes the flash circuit board 26 and the flash light source 10. A dry battery 27 is loaded in the flash unit 22. A battery holder 28 is secured to a lower portion of the flash circuit board 26, and includes a positive electrode segment 28a and a negative electrode segment 28b, between which the dry battery 27 is set as a power source. A main capacitor 29 is included in the flash unit 22 for charging, and disposed higher than and behind the flash circuit board 26. If the main capacitor 29 is charged to a prescribed reference level, an signaling LED (not shown) emits light in the flash circuit board 26. As the flash readiness indicator 8 transmits the light from the signaling LED, the upper end 8a is caused to emit light. This informs a user of the completion of the charging of the flash unit 22.

A sync switch 30 is included in the flash circuit board 26 to protrude laterally, and opens and closes in response to movement of a shutter blade (not shown) of the shutter mechanism. Upon turning on of the signaling LED, the shutter release button 7 is depressed to release the shutter mechanism. The sync switch 30 is turned on at the time of fully opening of the shutter blade. The flash light source 10 emits flash light toward an object.

Figure 3:
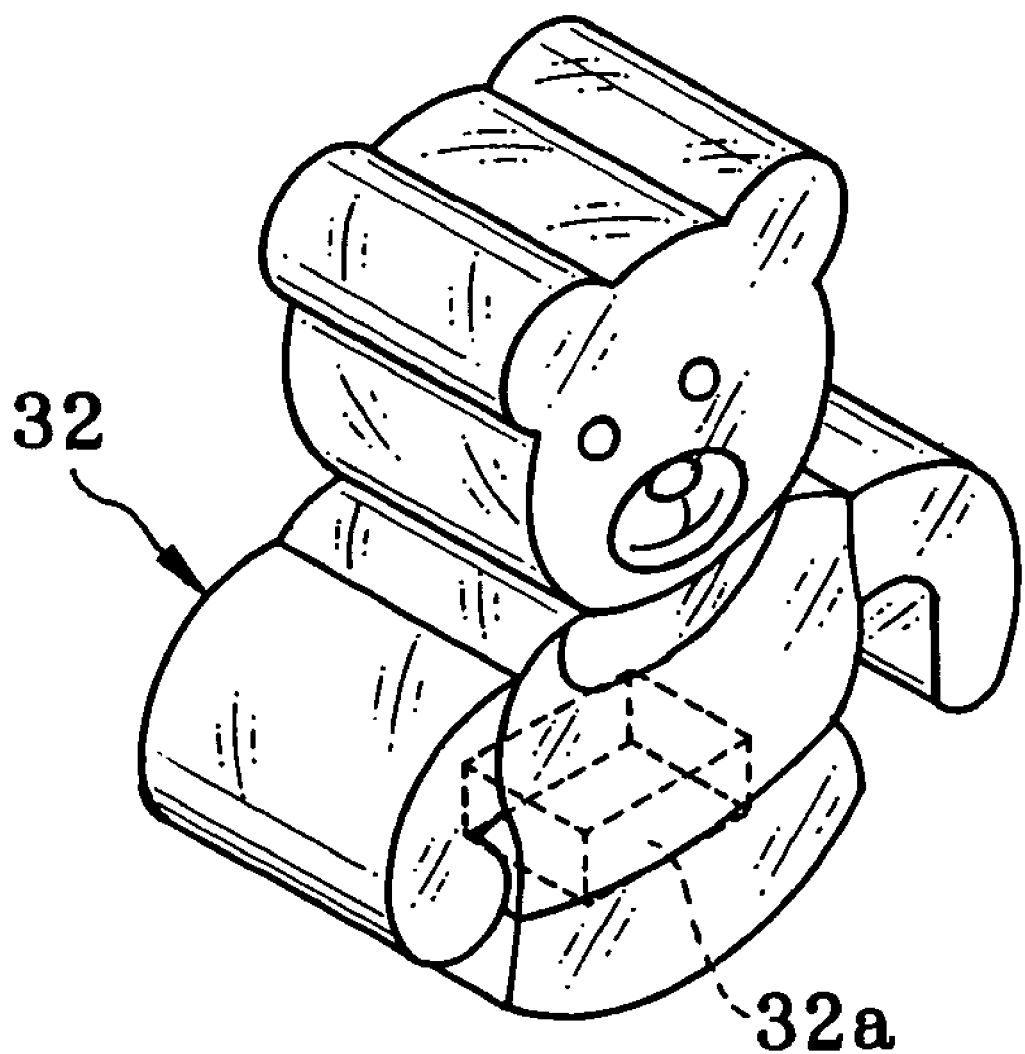
FIG. 3 is a perspective view illustrating an attention information indicator.
Figure 4:
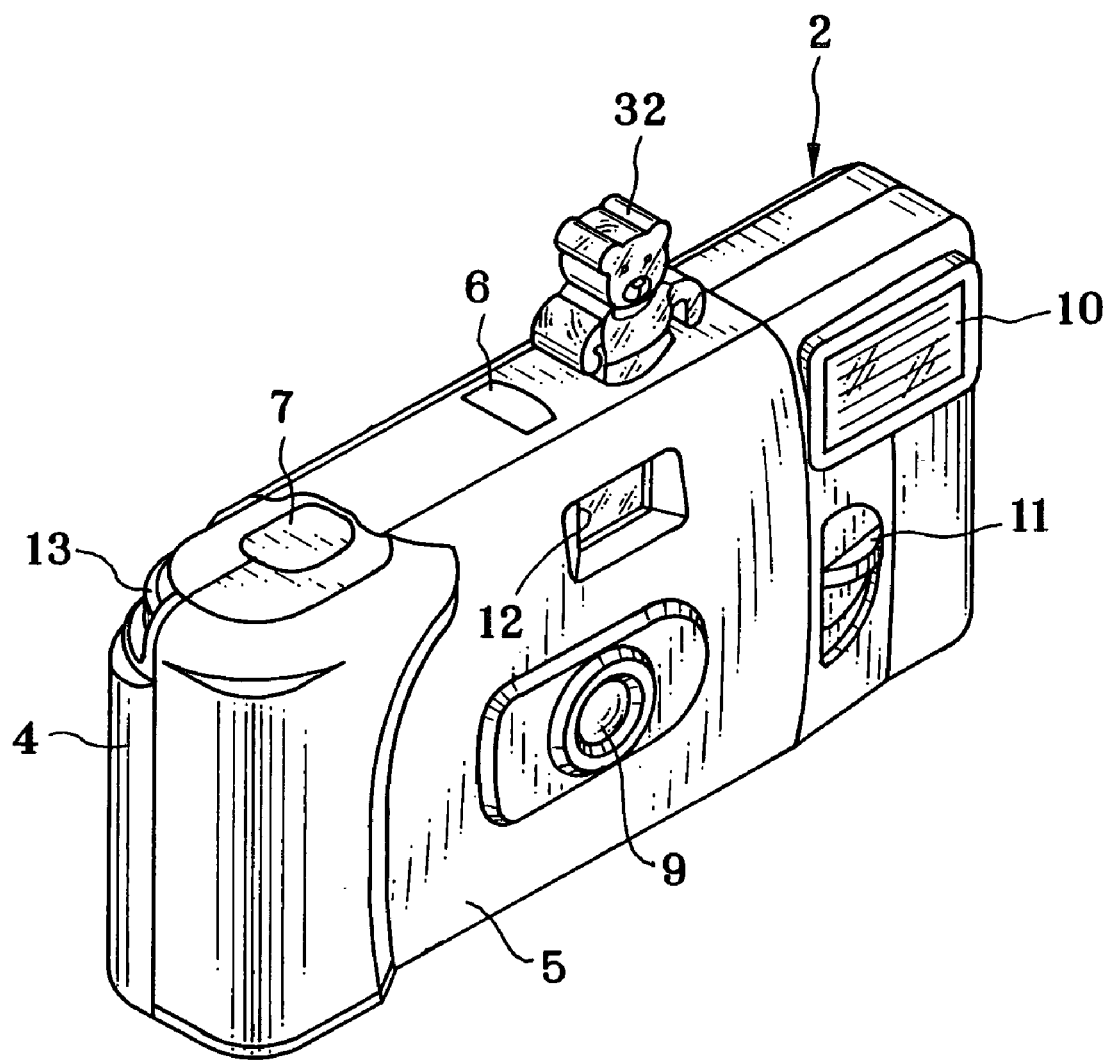
FIG. 4 is a perspective view illustrating a state of positioning the attention information indicator on the lens-fitted photo film unit.

An attention information indicator 32 is coupled to the upper end 8a of the flash readiness indicator 8 in a removable manner. See FIG. 3. The attention information indicator 32 is formed from resin, and has optical transmittance. An example of the attention information indicator 32 is shaped in a form of an animal as a character. A lower recess 32a is formed in a lower face of the attention information indicator 32, and is engaged with the upper end 8a. By the use of the lower recess 32a, the attention information indicator 32 can be combined with the lens-fitted photo film unit 2 as illustrated in FIG. 4. The attention information indicator 32 illuminates upon receipt of light from the flash readiness indicator 8.

In operation, at first, the attention information indicator 32 is fitted on the upper end 8a of the flash readiness indicator 8 by insertion in the lower recess 32a while the upper end 8a protrudes from the photo film housing 4. Thus, the attention information indicator 32 is set as illustrated in FIG. 4. Then the winder wheel 13 is rotated in the winding direction to wind and advance the photo film 17. An unexposed portion of the photo film 17 is set by the advance. The taking lens 9 is directed toward an object to be photographed, to frame the object. The button of the flash charger switch 11 is slid up. The main capacitor 29 comes to store electric charge to stand by for emitting flash through the flash light source 10. The signaling LED on the flash circuit board 26 is driven to illuminate. So the attention information indicator 32 is caused to emit light on the flash readiness indicator 8. The user is caused to recognize the ready state for illumination of the flash light source 10.

When the attention information indicator 32 emits light, attention of a person to be photographed is drawn on the attention information indicator 32, so that he or she can look at the lens-fitted photo film unit 2. When the shutter release button 7 is depressed, the person as an object can be photographed with the line of sight exactly directed to the taking lens 9. Flash light is emitted toward the person from the flash light source 10 by actuating the shutter release button 7. At the same time, the shutter mechanism is actuated to let the object light in the outer sticker 5 and shutter opening. The photo film 17 receives the incident object light on the exposure aperture, to take an exposure. After the exposure is taken, the one-frame advancing mechanism is unlocked. Further winding and shutter charging are enabled. Immediately after depressing the shutter release button 7, the attention information indicator 32 discontinues illumination because of the standby of the flash light source 10. When the charging of the flash light source 10 is completed again, the signaling LED on the flash circuit board 26 is driven to cause the attention information indicator 32 to illuminate in the same manner as the first time.

After the exposure, the button of the flash charger switch 11 is slid down to interrupt the charging that is preliminary to illumination of the flash light source 10. The signaling LED discontinues emission of light on the flash circuit board 26. The flash readiness indicator 8 and the attention information indicator 32 do not emit light.

The attention information indicator 32 of the present embodiment has a shape of an animal or other attractive article, which can soften the countenance of the person: of the object by psychological effect of an illuminating article. This is remarkably effective if the person is a child. Note that the lens-fitted photo film unit 2 is a single-use instrument and abandoned at the time of photofinishing without keeping by the user. However, the attention information indicator 32 is reusable and also can be kept by the user, because it is removable from the lens-fitted photo film unit 2.

Any suitable material with optical transmittance can be used for forming the attention information indicator 32. Examples of the materials for the attention information indicator 32 include not only resin but silicone rubber, styrene elastomers, glass and the like. Also, material for forming the attention information indicator 32 may be a composition containing a substance with optical transmittance, and particles of lame or metallized threads mixed therewith and having a characteristic of reflecting or diffusing light.

The attention information indicator 32 may be formed from material of any suitable color. The material can be transparent colored material, or can be translucent material.

Figure 5A:
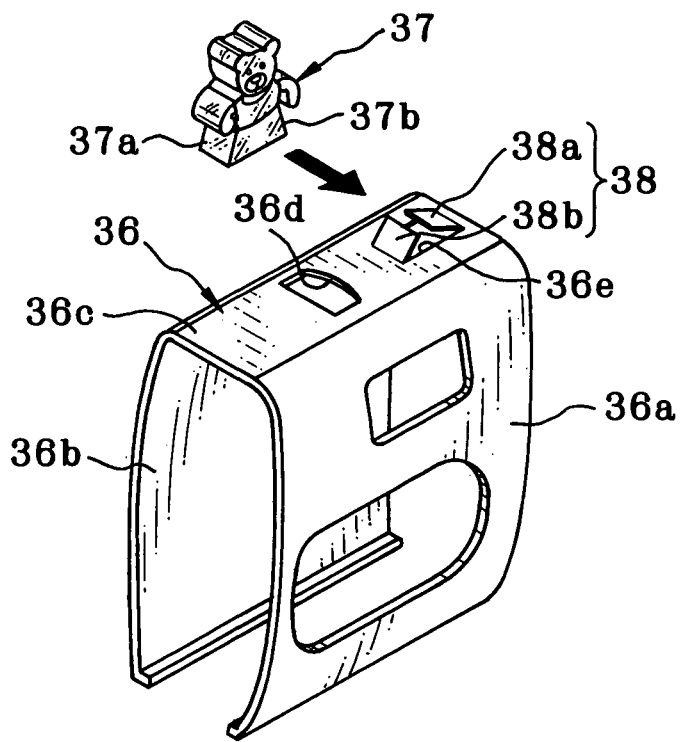
FIG. 5A is an exploded perspective view illustrating a middle adapter with the lens-fitted photo film unit.
Figure 5B:
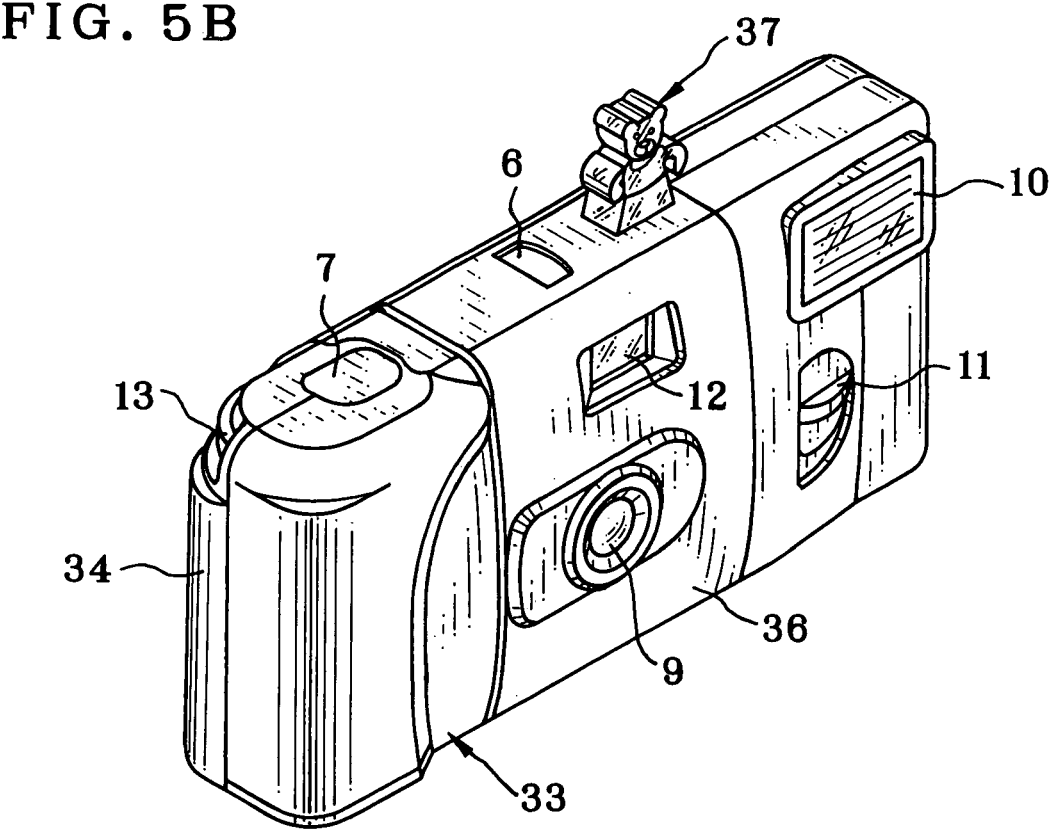
FIG. 5B is a perspective view illustrating the same as FIG. 5A but in an assembled state.

In FIGS. 5A and 5B, another preferred structure for an indicator with a middle adapter 36 is illustrated. A lens-fitted photo film unit 33 has a photo film housing 34 to which the middle adapter 36 is secured in a removable manner. The middle adapter 36 is formed from resin and has resiliency. A front panel 36a and a rear panel 36b of the middle adapter 36 squeeze the photo film housing 34 in a front-to-back direction in a clipped manner. Elements similar to the above embodiments are designated with identical reference numerals.

An upper panel 36c is a middle portion of the middle adapter 36, and covers an upper face of the photo film housing 34 when the middle adapter 36 is set on the photo film housing 34. An opening 36d in the upper panel 36c keeps the frame counter window 6 uncovered. A retaining portion 38 is formed with the upper panel 36c. An attention information indicator 37 is secured to the retaining portion 38 in a removable manner. Note that the photo film housing 34 may not have the outer sticker 5, because the middle adapter 36 can operate in place of the outer sticker 5.

The retaining portion 38 for the upper end 8a is described now. A pair of flaps 38a and 38b are formed by forming cuts in the upper panel 36c in an H-shape, and bent and opened in an outward direction. An opening 36e is defined, and allows the upper end 8a of the flash readiness indicator 8 to protrude externally. The attention information indicator 37 is moved in the arrow direction. Two skirts 37a and 37b are included in a lower portion of the attention information indicator 37, and have a tilted surface. The attention information indicator 37 is firmly set in the retaining portion 38 by keeping the skirts 37a and 37b in contact with the inner faces of the flaps 38a and 38b.

After the attention information indicator 37 is secured to the retaining portion 38, the front and rear panels 36a and 36b are set to nip the photo film housing 4 in a manner to position the frame counter window 6, the taking lens 9 and the viewfinder 12 at the respective openings formed in the middle adapter 36. In FIG. 5B, the middle adapter 36 pre-combined with the attention information indicator 37 is secured to the lens-fitted photo film unit 33.

Figure 6:
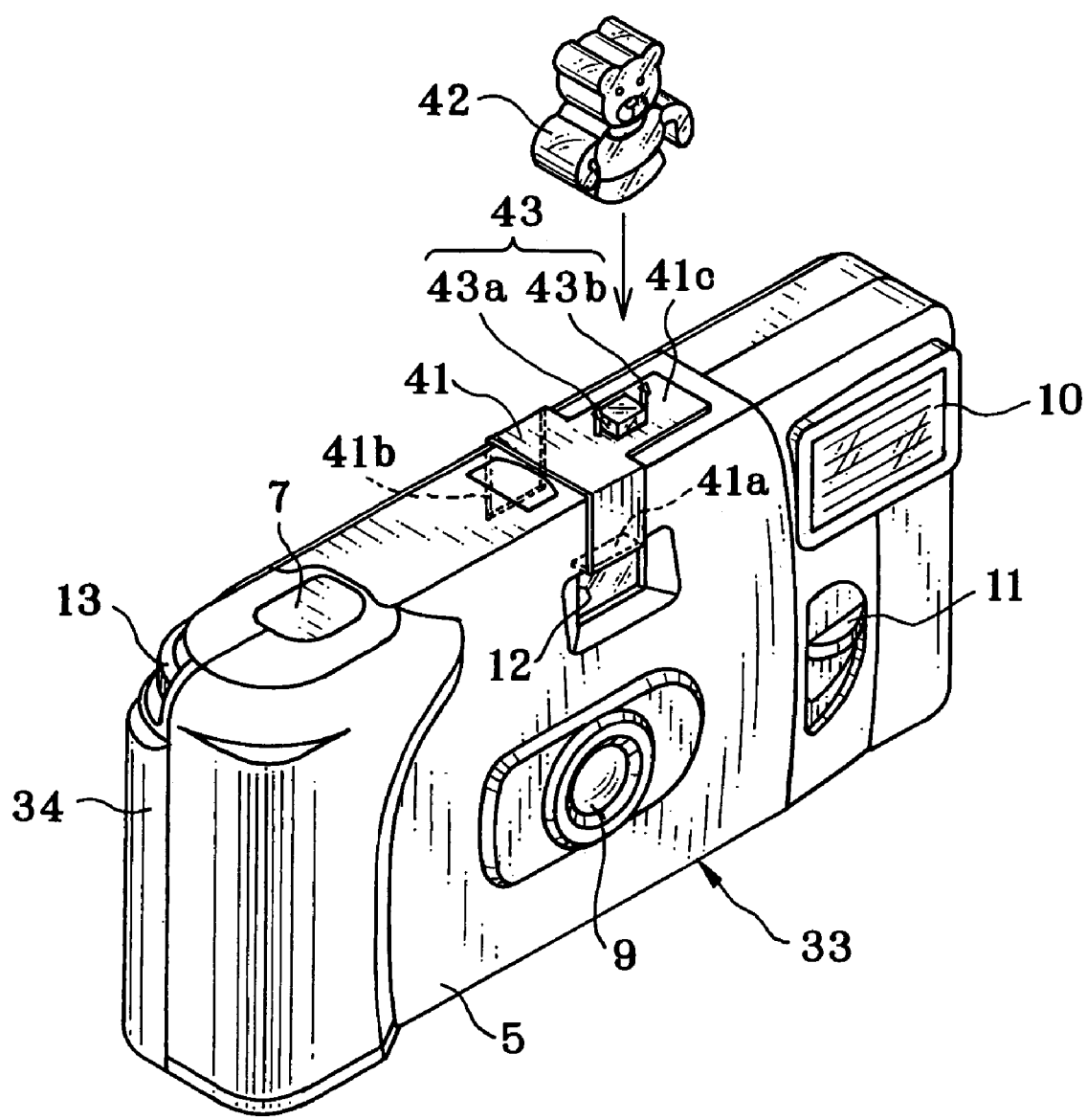
FIG. 6 is an exploded perspective view illustrating an upper adapter with the lens-fitted photo film unit.

In FIG. 6, an upper adapter 41 is formed from resin having resiliency, and is formed in a channel shape as viewed in a section. A front retaining projection 41a and a rear contact panel 41b are included in the upper adapter 41. A retaining recess is defined in an objective window of the viewfinder 12 of the photo film housing 34 directed to a photographic field. The rear contact panel 41b is tightly fitted on the rear surface of the photo film housing 34. So the upper adapter 41 is firmly secured to and combined with the lens-fitted photo film unit 33. Elements similar to those of the above embodiments are designated with identical reference numerals.

An upper panel 41c of the upper adapter 41 covers an upper face of the photo film housing 34. A retaining portion 43 is formed in the upper panel 41c. An attention information indicator 42 is secured to the retaining portion 43 removably. The retaining portion 43 includes two retaining claws 43a and 43b. Retaining holes are formed in a portion directly under the attention information indicator 42 to correspond to the retaining claws 43a and 43b. The attention information indicator 42 is secured to the retaining portion 43 by fitting the retaining claws 43a and 43b in these retaining holes.

Figure 7:
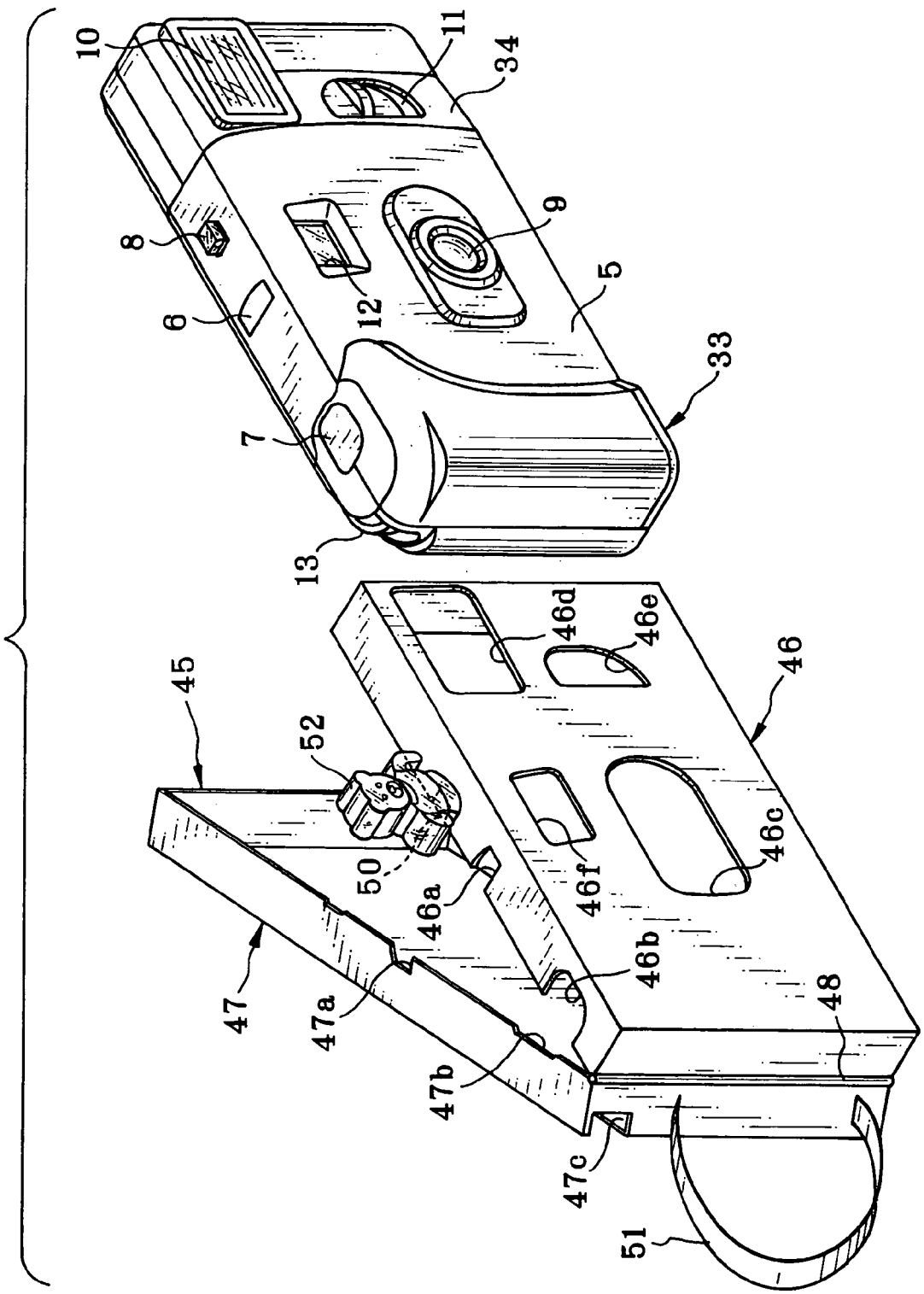
FIG. 7 is an exploded perspective view illustrating an outer case or covering adapter with the lens-fitted photo film unit.

In FIG. 7, an outer case 45 or covering adapter is used to contain the entire housing of the lens-fitted photo film unit 33, which can be used even in a contained state by means of suitable openings. The outer case 45 is constituted by a front case half 46 and a rear case half 47. The front case half 46 is set in front of the lens-fitted photo film unit 33. The rear case half 47 is set behind the lens-fitted photo film unit 33. A hinge 48 keeps the front case half 46 pivotally movable from the rear case half 47, and also keep those openable. A lock (not shown) is disposed for keeping the front case half 46 closed on the rear case half 47 after the insertion of the lens-fitted photo film unit 33 in the outer case 45. Elements similar to those of the above embodiments are designated with identical reference numerals.

Various negative portions are formed in the outer case 45, including recesses 46a, 46b, 47a, 47b, 47c and 50 and openings 46c, 46d, 46e and 46f. The recess 50 receives insertion of the upper end 8a of the flash readiness indicator 8. The recesses 46a and 46b cause the frame counter window 6 and the shutter release button 7 to appear. The openings 46c-46f keep the flash light source 10, the flash charger switch 11, the viewfinder 12 and the winder wheel 13 uncovered. Exposures can be taken by use of the lens-fitted photo film unit 33 without removing the outer case 45. A strap structure 51 in a shape of a flat strip is attached to the outer case 45 near to the hinge 48. This makes it possible for a user to handle and carry the lens-fitted photo film unit 33 by use of the outer case 45 as a carrying case. Note that the recess 50 is formed in the front case half 46.

An attention information indicator 52 is attached to the outer case 45 in a manner to close the recess 50. The attention information indicator 52 is set at the flash readiness indicator 8, fitted on the upper end 8a and emits light when the upper end 8a illuminates.

Note that the middle adapter 36, the upper adapter 41 and the outer case 45 according to the invention are constructed in a manner removable from the lens-fitted photo film unit as optical instrument. An attention information indicator may be included in a single piece of an adapter of any form, or may be firmly attached thereto. Of course, an attention information indicator may be removable from an adapter.

Figure 8:
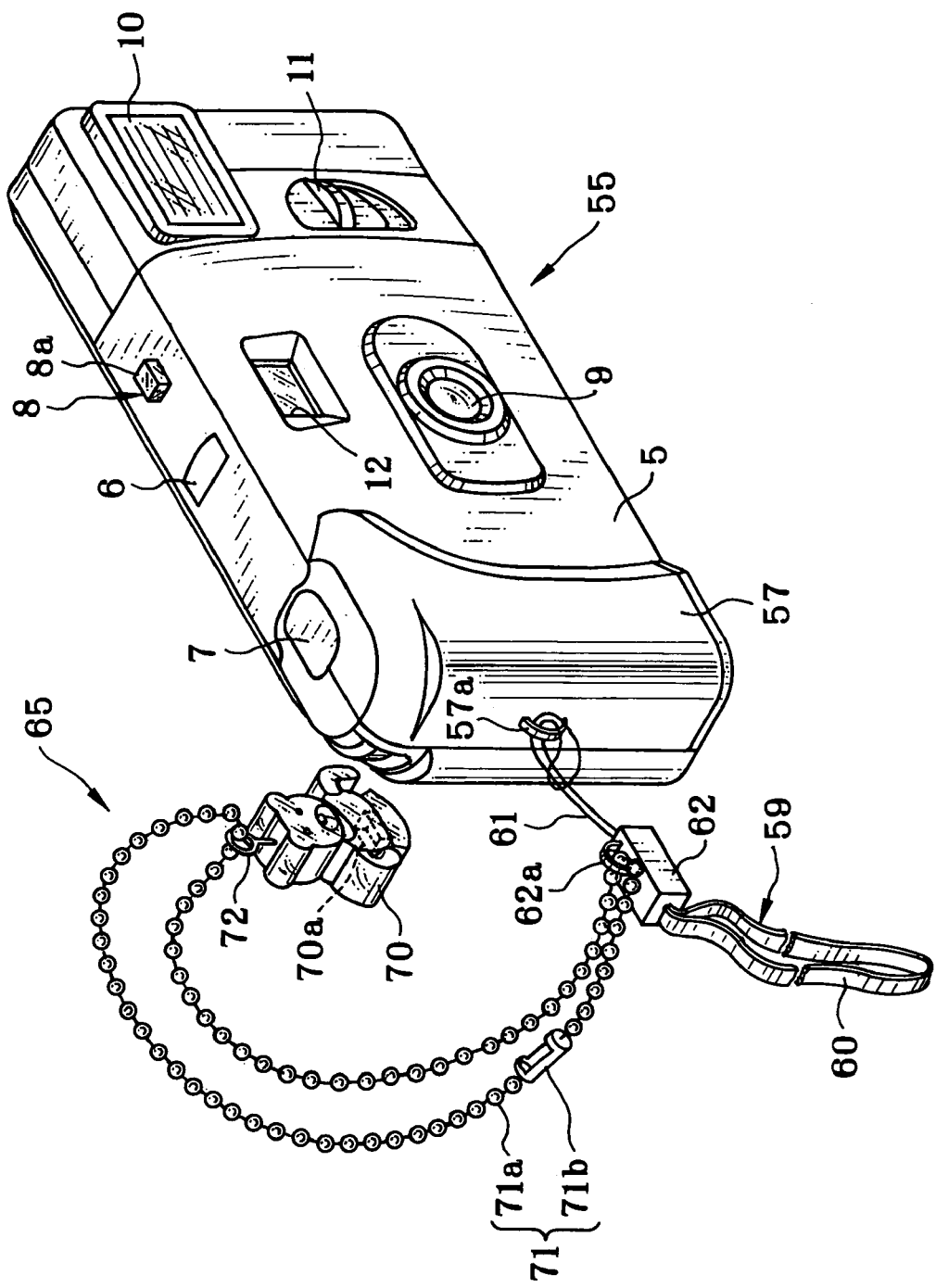
FIG. 8 is a perspective view illustrating a strap portion and an attention information indicator in connection.

In FIG. 8, another lens-fitted photo film unit 55 is illustrated, in which a strap structure 59 is secured to a photo film housing 57. The strap structure 59 includes a strap portion 60, a loop-shaped auxiliary strip 61, a strap end block 62, and an accessory unit 65. The strap end block 62 connects the strap portion 60 to the loop-shaped auxiliary strip 61. An accessory retaining ring 57a is formed on the photo film housing 57, and connected with the loop-shaped auxiliary strip 61 so as to fasten the strap structure 59 to the photo film housing 57.

A strap end ring 62a is disposed on the strap end block 62 for connection with the accessory unit 65. The accessory unit 65 includes an attention information indicator 70, an extension chain 71 as chain-shaped strip, and an indicator connecting ring 72. The indicator connecting ring 72 connects the attention information indicator 70 to the extension chain 71. The extension chain 71 includes a ball group or ball chain 71a and a chain fastener 71b which fastens a first end of the ball group 71a to a second end of the same, to form a looped shape. One of the first and second ends of the ball group 71a is disengaged from the chain fastener 71b before the extension chain 71 can be removed from the strap end block 62. Elements similar to the above embodiments are designated with identical reference numerals. If the extension chain 71 is regarded as one important extending strip, the strap end ring 62a constitutes a first portion of the strip of which the ball group 71a constitutes a second portion.

A lower recess 70a is formed in a lower face of the attention information indicator 70 fittable on the upper end 8a. The upper end 8a is inserted in the lower recess 70a to fit the attention information indicator 70 on the flash readiness indicator 8 and secure the same to the lens-fitted photo film unit 55. Note that the extension chain 71 is has such a suitable length that, when the attention information indicator 70 is set on the lens-fitted photo film unit 55, the extension chain 71 does not enter a region where object light passes toward the taking lens.

The attention information indicator 70 illuminates in response to emission of light of the flash readiness indicator 8. The attention of a person as an object is drawn to the attention information indicator 70 upon the illumination, so he or she looks at the lens-fitted photo film unit 55 appropriately. The shutter release button 7 can be depressed, so a photograph can be taken while the line of sight of a person can extend exactly toward the taking lens 9. Note that the attention information indicator 70 can be handled and carried easily because the attention information indicator 70 is fastened to the strap structure 59 extending from the photo film housing 57. This is also effective from a decorative point of view.

In the above embodiment, the upper end 8a of the flash readiness indicator 8 always protrudes from the photo film housing 4. However, the flash readiness indicator 8 according to the invention may not protrude from the top of the photo film housing 4. Furthermore, the flash readiness indicator 8 can be constructed in a movable manner. When the flash unit is not used, the upper end 8a may be set in a first position where the upper end 8a is flush with or retracted from the outer contour of the photo film housing 4. When the button of the flash charger switch 11 is slid up, the upper end 8a may be set in a second position to protrude from the top of the photo film housing 4.

Note that optical instruments according to the invention can be any device other than lens-fitted photo film unit, for example, camera for repeated use, digital still camera with electronic circuitry, and the like which may have the flash readiness indicator 8 for signaling information of a ready state for flashing after charging.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A device for photographing, having a housing provided with an electronic flash unit, comprising:
   a flash readiness indicator, secured to said housing, which when illuminated signals readiness of said flash unit upon charging; and
   an attention information indicator, having optical transmittance, removably secured to said flash readiness indicator to protrude from said housing, for externally emitting light emitted by said flash readiness indicator visibly from an object side.

2. A device for photographing as defined in claim 1, wherein said device for photographing is a lens-fitted photo film unit pre-loaded with photo film.

3. A device for photographing as defined in claim 2, further comprising an outer case secured outside said housing;
wherein said attention information indicator is secured by use of said outer case to said flash readiness indicator.

4. A device for photographing as defined in claim 1, wherein said flash unit includes:
a flash light source for applying flash light to a photographic field;
a flash circuit for controlling said flash light source;
a signaling light-emitting element for emitting light in response to completion of charging of said flash circuit;
said flash readiness indicator comprises a light guide for conducting said light from said signaling light-emitting element to exit from said housing through an end thereof.

5. A device for photographing as defined in claim 4, wherein said attention information indicator is engaged removably with said light guide.

6. A device for photographing as defined in claim 1, wherein said attention information indicator is secured by use of an adapter to said flash readiness indicator.

7. A device for photographing as defined in claim 6, wherein said adapter has two portions so disposed that said housing is disposed between and in a clipped manner.

8. A device for photographing as defined in claim 7, wherein said adapter extends from an upper face of said housing toward a lower face thereof.

9. A device for photographing as defined in claim 7, further comprising a recess formed in a surface of said housing;
wherein said adapter includes a retaining projection for engagement with said recess to retain on said housing.

10. A device for photographing as defined in claim 9, wherein said adapter extends from an upper face of said housing downwards, and said retaining projection is formed with one lower end of said adapter.

11. A device for photographing as defined in claim 1, further comprising a strap portion, secured to said housing, and adapted to handling of said housing with portability;
wherein said attention information indicator is connected with said strap portion in an accessory manner.

12. A device for photographing as defined in claim 11, wherein said strap portion has one strap end;
further comprising:
an accessory retaining portion, formed on said housing, for retention of said strap end;
a chain-shaped strip, having first and second portions, said first portion being secured to said strap end, and said second portion being provided with said attention information indicator.

13. A device for photographing as defined in claim 12, further comprising an auxiliary strip for securing said strap end to said accessory retaining portion.

14. The device for photographing as defined in claim 1, wherein said flash readiness indicator protrudes from an upper surface of said device and said attention information indicator has a recess in the bottom thereof that releasably receives the flash readiness indicator.

15. A device for photographing, having a housing provided with an electronic flash unit, comprising:
a flash readiness indicator, secured to said housing, which when illuminated signals readiness of said flash unit upon charging;
an attention information indicator for contact with said flash readiness indicator and for externally emitting light emitted by said flash readiness indicator visibly from an object side;
an adapter, secured to said housing, for releasably retaining said attention information indicator in contact with said flash readiness indicator.

16. A device for photographing as defined in claim 15, wherein said adapter has two portions so disposed that said housing is disposed between and in a clipped manner.

17. A device for photographing as defined in claim 15, wherein said adapter is constituted by an outer case secured outside said housing.

18. A device for photographing, having a housing provided with an electronic flash unit, comprising:
a flash readiness indicator, secured to said housing, which when illuminated signals readiness of said flash unit upon charging;
a strap portion, secured to said housing, and adapted to handling of said housing with portability; and
an attention information indicator, having optical transmittance, connected with said strap portion in an accessory manner, secured for use to one portion of said flash readiness indicator removably to protrude from said housing, for externally emitting light emitted by said flash readiness indicator visibly from an object side.

* * * * *